United States Patent [19]
Mueller

[11] Patent Number: 5,128,862
[45] Date of Patent: Jul. 7, 1992

[54] CUSTOMER OPERABLE SYSTEM FOR A RETAIL STORE OR FAST-FOOD RESTAURANT HAVING PLURAL ORDERING STATIONS

[75] Inventor: Raymond J. Mueller, Littleton, Colo.

[73] Assignee: Management Information Support, Inc., Lakewood, Colo.

[21] Appl. No.: 577,316

[22] Filed: Sep. 4, 1990

Related U.S. Application Data

[63] Continuation of Ser. No. 373,381, Jun. 28, 1989, abandoned.

[51] Int. Cl.⁵ .................................................. G07G 1/12
[52] U.S. Cl. .............................. 364/405; 364/709.03; 364/709.04
[58] Field of Search ........... 364/401, 405, 406, 709.03, 364/709.04

[56] References Cited

U.S. PATENT DOCUMENTS

| | | | |
|---|---|---|---|
| 3,237,198 | 2/1966 | Slutsky | 346/17 |
| 3,304,416 | 2/1967 | Wolf | 377/13 |
| 3,445,633 | 5/1969 | Ratner | 235/381 |
| 3,622,995 | 11/1971 | Dilks et al. | 235/382 |
| 3,786,421 | 1/1974 | Wostl et al. | 235/381 |
| 3,826,344 | 7/1974 | Wahlberg | 194/206 |
| 3,931,497 | 1/1976 | Gentile et al. | 235/381 |
| 4,073,368 | 2/1978 | Mustapick | 186/53 |
| 4,128,757 | 12/1978 | Garner, Jr. | 235/383 |
| 4,169,521 | 10/1979 | Vayda, Jr. | 186/36 |
| 4,247,759 | 1/1981 | Yuris et al. | 235/381 |
| 4,300,044 | 11/1981 | Gould et al. | 235/381 |
| 4,388,689 | 6/1983 | Hayman et al. | 364/401 |
| 4,396,985 | 8/1983 | Ohara | 364/405 |
| 4,415,065 | 11/1983 | Sandstedt | 186/39 |
| 4,428,049 | 1/1984 | Miyazaki | 364/405 |
| 4,449,186 | 5/1984 | Kelly et al. | 364/407 |
| 4,530,067 | 7/1985 | Dorr | 364/900 |
| 4,547,851 | 10/1985 | Kurland | 364/401 |
| 4,553,222 | 11/1985 | Kurland et al. | 364/900 |
| 4,567,359 | 1/1986 | Lockwood | 235/381 |
| 4,569,421 | 2/1986 | Sandstedt | 186/39 |
| 4,582,172 | 4/1986 | Takeuchi et al. | 186/38 |
| 4,589,069 | 5/1986 | Endo et al. | 364/405 |
| 4,593,186 | 6/1986 | Fukatsu | 235/379 |
| 4,638,312 | 1/1987 | Quinn et al. | 340/825.35 |
| 4,675,515 | 6/1987 | Lucero et al. | 235/381 |
| 4,722,053 | 1/1988 | Dubno et al. | 364/401 |
| 4,775,935 | 10/1988 | Yourick | 364/401 |
| 4,797,818 | 1/1989 | Cotter | 364/401 |
| 4,882,475 | 11/1989 | Miller et al. | 235/383 |

FOREIGN PATENT DOCUMENTS 0197958 11/1984 Japan .
0005470 1/1987 Japan .

OTHER PUBLICATIONS

English language translation of Morita et al., JP 62-5470.

*Primary Examiner*—Dale M. Shaw
*Assistant Examiner*—Andrew F. Bodendorf
*Attorney, Agent, or Firm*—Sheridan Ross & McIntosh

[57] ABSTRACT

An integrated customer self-order microprocessor based system for the placement of orders, the filling of orders and the management of day to day operations in a fast food restaurant setting. The system includes one or more customer input stations, a cashier station, a manager station and a food preparation station. Optionally, the system may include a runner station and a consolidation station. The customer and cashier stations include a microprocessor terminal equipped with a touch screen interactive input device.

13 Claims, 3 Drawing Sheets 5,128,862

CUSTOMER OPERABLE SYSTEM FOR A RETAIL STORE OR FAST-FOOD RESTAURANT HAVING PLURAL ORDERING STATIONS

This is a continuation of application Ser. No. 07/373,381, filed Jun. 28, 1989 now abandoned.

BACKGROUND OF THE INVENTION

1. Field of the Invention

This invention relates to an extremely flexible integrated system for managing the placing and filling of orders in restaurants. Customers are able to place their orders via touch screen microprocessor terminals that are connected to restaurant employee terminals that display customer orders.

2. Description of the Related Art

Identifying, training and retaining courteous and capable personnel has become one of the most critical concerns in the management of restaurants. This is particularly true in those establishments that have come to be known as "fast food" restaurants. Such establishments emphasize the delivery of food in a timely and relatively inexpensive manner, while delivering consistently high quality products. Effective and capable employees are a prerequisite for obtaining each of these goals.

Unfortunately, the labor pool for such establishments is shrinking at the same time that a demand for such employees is increasing. Means for effectively reducing the number of employees in any single store can provide a significant cost advantage for the operation of a fast food restaurant.

There are relatively few references to integrated microprocessor-based systems for maximizing efficiencies and effectively reducing the number of employees required to staff a fast food establishment.

U.S. Pat. Nos. 4,722,053 of Dubno et al., 4,533,222 of Kurland, and 4,457,851 of Kurland et al. describe customer interactive systems for use in restaurants. An essential feature of each of these systems is the combined capabilities for customers to utilize microprocessor monitors located at individual tables for entertainment--such as playing video games--and ordering food. These systems are not designed primarily for efficiency, but as a unique restaurant concept or theme.

U.S. Pat. No. 4,675,515 of Lucero describes a drive-through credit card payment device for use by fast food restaurants. The system allows the customer to place his own order if desired at the remote drive through station. Efficiency improvements derived from this system are focused predominantly on the cash management aspects of the device. Also see U.S. Pat. No. 4,638,312 of Quinn, et al.

The system disclosed in U.S. Pat. No. 4,797,818 of Cotter includes a regional food order and delivery system. The system is comprised of a centralized order receiving center that inputs orders into a microprocessor and selects the appropriate outlet for delivery of the ordered food.

U.S. Pat. No. 4,567,359 of Lockwood describes a customer self-order system designed for the sale of insurance. A microprocessor system interacts with the customer, supplying various options based upon responses made by the customer to introductory questions.

Finally, U.S. Pat. No. 4,775,953 of Yourick describes an interactive video marketing system that is not related to the restaurant industry. This system "selects" what presentations should be made to the consumer based upon both historical experience (e.g. likelihood of type of user based on time of day or weather) and real time responses from the customer.

Computerized order systems in fast food restaurants are not uncommon. Generally, these systems require that the customers verbally convey their order to the cashier/counter person, who enters the order into a combined cash register/order input system that will calculate the total price and deliver the order to the food preparers. See, for example, U.S. Pat. Nos. 4,569,421 and 4,415,065 of Sandstedt, U.S. Pat. No. 4,388,689 of Hayman et al., and U.S. Pat. No. 4,530,067 of Dorr.

The computerized restaurant systems currently available are also limited in other manners. Typically, such systems can only be expanded to include approximately 10-20 input sources. With the development of new fast food marketing schemes, e.g., the food court concept whereby several fast food restaurants use a common dining area, this limitation of the previous systems could be critical.

There is a need for an integrated customer self-order system that will effectively accomplish the needs of the customer and the restaurant, particularly one which reduces the number of cashiers required to process a given number of customers.

SUMMARY OF THE INVENTION

The present invention describes an integrated customer self order system for the operation of fast food restaurants. According to the invention, two or more customer stations, through which customers place their own orders, are associated with a single cashier station. By shifting the responsibility for order placement to the customer, the cashier will not be routinely involved in the order taking process, but will be predominantly concerned with the settling of bills.

The system of the present invention also includes a manager station and a food preparation station. Optionally, the system may include both a runner station and a data consolidation station. The highly integrated nature of the system, controlled by a plurality of cooperatively programmed microprocessor units, creates an extremely efficient and flexible system for the operation of a fast food restaurant.

In a preferred embodiment, the customer stations, the cashier station, the manager station, the food preparation station and the runner station all include video terminals for the instantaneous display of critical information. In addition, the terminals of the customer stations and the cashier station are provided with touch screen overlays. The system is thereby adapted so that all routine interactive input with the microprocessor units of the system can be accomplished without the use of keyboards or other independent input means.

The integrated customer self order system of the present invention is further characterized by the degree of flexibility that is available to the manager of the individual restaurant. The visual display that is presented to the customer to initiate the ordering process, as well as that seen throughout the process, can be specifically adapted to the requirements of individual restaurants or preference of individual managers.

An integral function of the system is automatic processing and summarizing of short and long term data. The manager station of the system aids the restaurant manager by summarizing a large number of variables in order to assist the manager in inventory, personnel and product selection decisions.

The system provides a comprehensive scheme for the efficient operation of a fast food restaurant. The incorporation of a plurality of customer stations for each cashier station--coupled with the touch screen input--provides for an improved management tool.

DESCRIPTION OF THE PREFERRED EMBODIMENT

This invention is specifically directed to use as a customer self-order system in a fast food restaurant. It is obvious, however, that the system described and claimed herein could be employed in a variety of different retail operations where minimizing customer contact may be desirable. Such a system could be used, for example, in an automobile parts store or a "catalogue" showroom store. Although certain adaptations would necessarily be required to fit the system to such other applications, the basic system could be adapted for such purposes.

The basic features of the present invention are the combination of (a) sets of one or more customer self-order stations equipped with touch screen input terminals, (b) a cashier station associated with one or more customer stations, (c) a food preparation station, and (d) a manager station. Alternative embodiments of the invention may include "runner" stations and a central data consolidation station.

Preferably, a customer places his own order at one of the customer stations. Of course, the system is designed in such a manner that those customers who are unable or unwilling to utilize the self-ordering capabilities of the system can be assisted by employees of the restaurant without disrupting the functioning of the overall system. An employee at the cashier station receives money from the customer in payment of the bill for the order, and operates the cash drawer. Employees of the restaurant prepare orders at the food preparation station, while the manager station monitors the various aspects of the system.

The integrated ordering system of the present invention is characterized by its flexibility. The owner or manager of an individual establishment utilizing the system has a multitude of options with respect to tailoring the system to his needs. For example, the customer touch screen terminal may be programmed so that customers are provided with a running total cost of items ordered during ordering, or it may be programmed to display the total only after the order has been completed.

Figure 1:
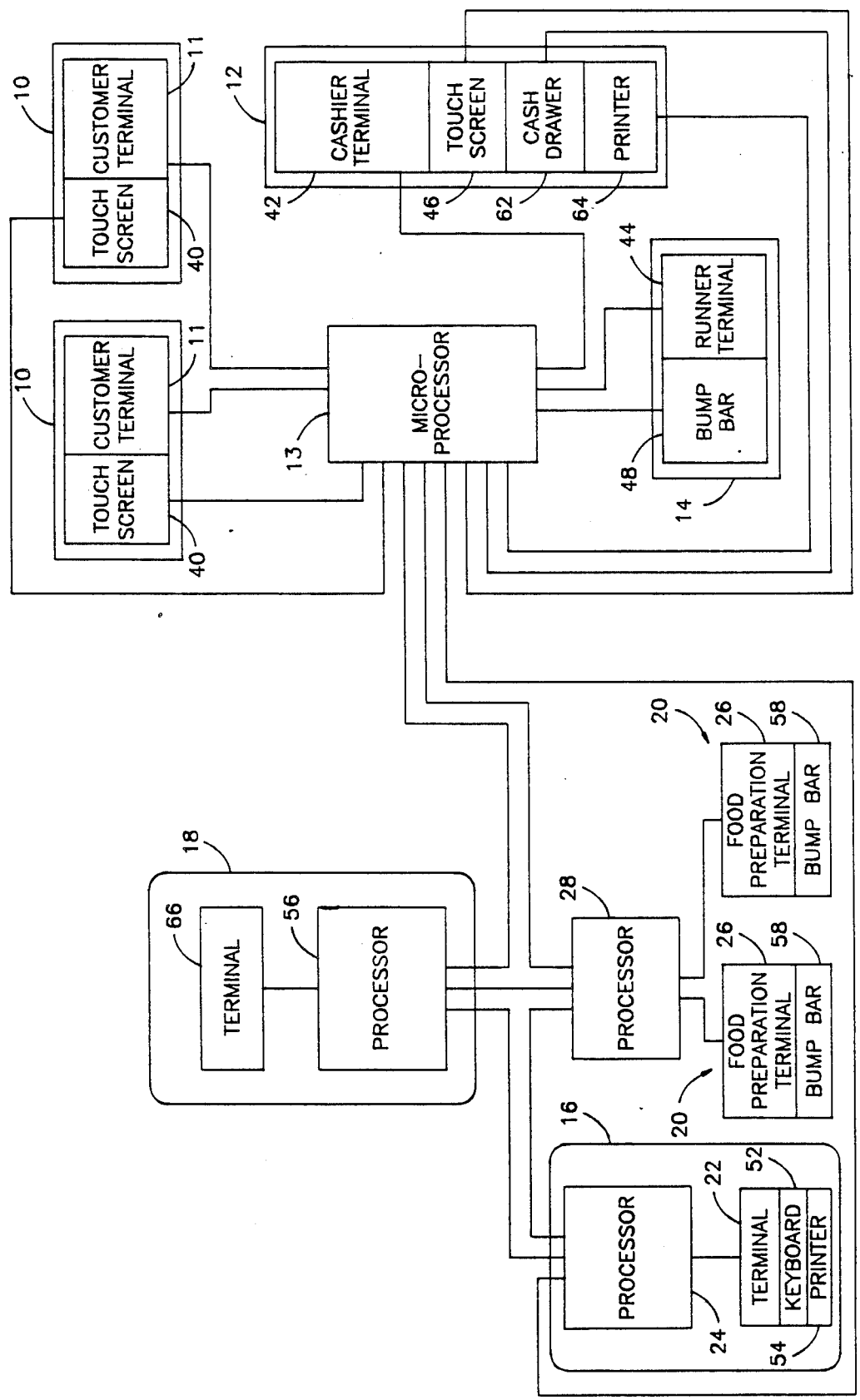
FIG. 1 is a general block diagram showing an overview of an embodiment of a system for customer self-ordering.

FIG. 1 illustrates the various components of an embodiment of the present invention. In brief summary, the system of the present invention comprises customer stations 10, a cashier station 12, a "runner" station 14, a manager station 16, a consolidation station 18 and a food preparation station(s) 20. Because extreme flexibility may be found in the system of the present invention, the description of the preferred embodiment shown in FIG. 1 will also include suggested alternatives to the preferred system.

The system is flexible in terms of size and configuration. FIG. 1 shows one cashier station 12 and two customer stations 10 associated therewith. However, more than two customer stations 10 may be associated with a single cashier station, and the system can support several sets of customer stations and cashier stations without having to add an additional manager station 16 or consolidation station 18. Typically, one runner station 14 will be associated with each cashier station 12, while the number of food preparation stations 20 is dictated by the size and set up of the kitchen facilities. Due to the use of a plurality of integrated microprocessor units, the system is capable of expanding to include over 100 customer stations 10.

The customer station 10 consists of a customer terminal 11 that either rests upon or is somehow integral with or embedded in the order counter of the fast food restaurant. In the preferred embodiment, a touch screen overlay 40 is mounted on the terminal 11. As explained in detail below, rather than having keyboard or "touch pad" input, customer interaction with the system consists of the customer physically contacting the touch screen overlay 40 with a finger or hand, or using a stylus on the terminal screen, in response to various prompter messages that are displayed on the terminal 11. Of course, other touch pad or touch sensitive inputs could also be employed. An additional alternative would be a clear plastic overlay that rests upon a board listing the various items available from the restaurant, the board having touch sensitive means that are activated by the touching of the listed items.

In the embodiment of the invention shown in FIG. 1, the two customer order stations 10 are both operated by a single self-contained microprocessor unit 13. Alternatively, each customer station 10 may be operated by its own microprocessor. The single microprocessor unit 13 also controls the displays shown on a cashier terminal 42 of the cashier station 12 and a runner terminal 44 of the runner station 14.

Due to the nature of the microprocessor systems currently used, it has been found that the inclusion of more than two customer stations 10 operated by a single microprocessor 13 may cause undesired delays in order processing and data presentation. It would be possible to increase the storage and processing capabilities of the microprocessor utilized in order to eliminate this concern. It would also be possible to have each customer station 10 and each cashier station 12 under the control of a separate microprocessor 13. The customer stations 10 and the cashier station 12 need not be operated by the same microprocessor for the system to be operable. Preferably, there are at least two customer stations 10 for each cashier station 12 in a restaurant. Due to the design of the system, it is not necessary for there to be common microprocessor operation for there to be complete, instantaneous communication among all of the stations in the system.

Each customer station 10 may also include a cash management panel. Such a panel would allow the customer to pay for his order, either with cash or credit card, without interfacing with any employees of the restaurant. Such a cash management function can be made an integral part of the system of the present invention.

The ability of the system to couple more than one customer station 10 to each casher station 12 is key to the present invention. The traditional "wait person" function of a cashier to interact with a customer during the food ordering process is shifted entirely to the customer. The cashier's function is to accept money tendered by the customer and collect and deliver ordered items, except in those limited situations where the customer is unable or unwilling to use the self-order input. In such situations, the cashier may place the order for the customer in the conventional manner, i.e., at the cashier station 12. A runner may be employed to gather the various items of a customer order, and deliver the same to the customer. However, the system could support an interface to a completely automated restaurant including robots for food preparation and conveyor systems for delivering food to the customer.

The cashier station 12 consists of the cashier terminal 42 equipped with a touch screen overlay 46. Again, the use of keyboards and/or touch pads for interacting with the microprocessor is eliminated. The runner station 14 consists of a video terminal 44 for displaying customer orders. Since limited microprocessor interaction is required of the runner, the runner station 14 generally will not require touch-screen capabilities. The runner station 14 may include a bump bar device 48. Use of the bump bar 48 enables the runner to eliminate orders from the runner terminal 44 after the orders have been filled.

The manager station 16 includes a terminal 22 and a self-contained microprocessor unit 24. The manager station 16 includes a keyboard 52 for making non-routine program variations and a printer 54 for printing out various data compilations.

The consolidation station 18 consists of a self-contained microprocessor unit 56. A display terminal 66 for use in conjunction with the consolidation station 18 may be desirable, but is not essential to the operation of the system. The consolidation station 18 is an optional portion of the system. All of the data generated by the entire system is accumulated and stored at the consolidation station 18.

Preferably, the food preparation stations 20 are controlled by a single self-contained microprocessor unit 28. Alternatively, each food preparation station 20 may include its own microprocessor unit. In the preferred embodiment of the invention, each food preparation station 20 includes a terminal 26. The terminals 26 do not have a touch screen overlay, but each is equipped with a bump bar device 58 for deleting completed orders from the screen of the respective terminals 26. In some circumstances and as seen in FIG. 1, the system may include one or more food preparation stations 20 in order to give employees in different areas of the kitchen access to a food preparation station.

The microprocessor units 13, 24, 28 and 56 are connected via message relay cables from the short term memories of the various units. For example, any input made to one of the customer terminals 11 by a customer can be made immediately available to the microprocessor units associated with the manager station 16, the consolidation station 18, and the food preparation stations 20.

Figure 2:
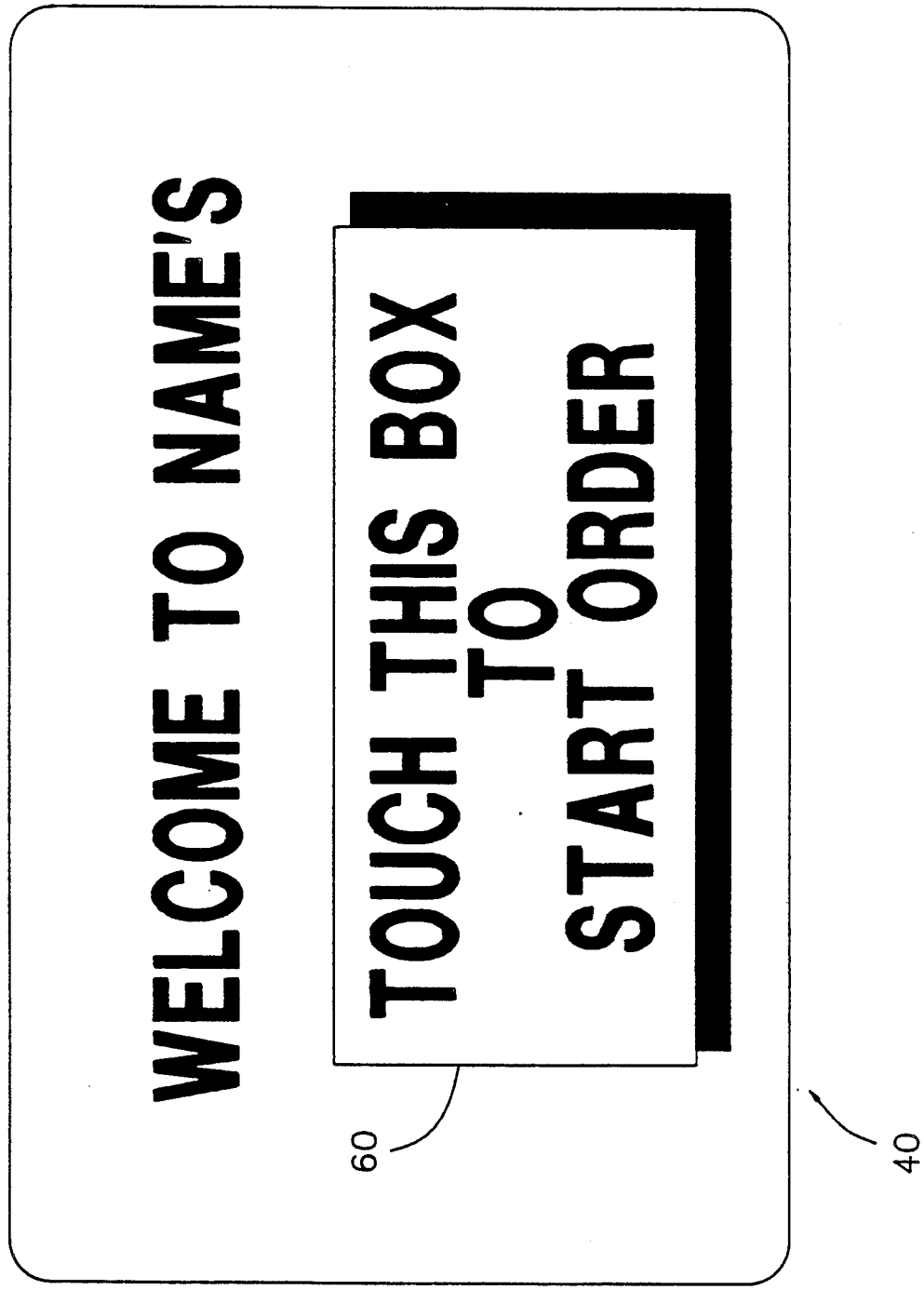
FIG. 2 is a data entry screen displayed at customer stations according to a preferred embodiment.

In a typical operational cycle of the system, a customer terminal 11 displays a screen which asks a customer whether he would like to place an order, as shown in FIG. 2. The system is engaged when the customer touches an indicated portion 60 of the terminal touch screen 40. A series of options are then presented to the customer. The system is designed to be adapted by the individual restaurant to display to the customer each of the products offered by the restaurant. The customer responds to the various options displayed by either ordering items displayed on the customer terminal 11 or proceeding to the next screen of options by touching or otherwise activating an appropriate portion of the touch screen 40. To indicate completion of an order, the customer touches a specific portion of the touch screen 40—again in response to a visual prompt—-and the order is finalized.

In one embodiment of the present invention where touch screen overlays are utilized, the system may be programmed so that the display on the customer terminal 11 has "buttons", which when touched cause a specific option to be initiated or item ordered. It would also be possible for one skilled in the art to adapt the system so that once a selection has been made there will be an interactive response on the screen, such as a flashing box.

In addition to the tailoring of the system to specific items offered by the restaurant, there are several additional options that the restaurant manager may include. For example, a running list of items ordered by a customer, or the cumulative cost of an order may be continuously or intermittently displayed on the customer terminal 11. The system may also be programmed to display items ordered by the customer instantaneously at the runner and food preparation stations 14, 20, or to wait until the customer has indicated that he has finished ordering.

One valuable tool that the system of the present invention may employ is the use of multiple languages. For example, the system may be programmed so that the first screen displayed on the customer terminal 11 asks the customer to initiate the ordering process in two or more languages. All additional messages on the customer terminal 11 will be presented in the selected language. This capability can also be useful when the manager, runner or food preparer speaks a language other than that commonly spoken in the locality of the restaurant, as any monitor or display screen can display data in any available language by programming the system to automatically translate the order into the desired language for specified terminals.

An additional function that may be incorporated into the present system is the use of suggestive selling techniques. In the suggestive selling mode, the system may be programmed to analyze each customer's order and, before the ordering process is completed, suggest items from the restaurant's menu that may logically be included with that customer's order. For example, a customer who has ordered only a sandwich and french fries may be asked, by a display on the customer terminal 11, whether he would like a soft drink as well.

The cashier station 12 is designed to allow a single cashier to process monetary exchanges with customers from different customer stations 10. The cashier terminal 42 may display a customer's entire order, including the total charge for the order. The cashier enters the amount tendered by the customer into the system via the touch screen using a keyboard displayed on the cashier monitor 42, or by other touch responsive means. The microprocessor 13 then calculates and causes to be displayed the amount of change to be returned to the customer. A cash drawer 62 associated with each cashier station 12 allows each cashier station 12 to operate as a traditional cash register. A printer 64 for printing customer receipts is also associated with each cashier station 12.

The cashier station 12 may also be equipped with a reader (not shown) of some type for reading data from coupons for evaluation by the system. The coupons can be read into the system by any number of means, such as a bar code reading device. Alternatively, code numbers on a coupon can simply be entered into the system by the cashier. The microprocessor can be programmed so that once a coupon has been entered into the system, the microprocessor determines whether the coupon is in effect, whether it is applicable to the transaction, and how it will affect the total bill.

The system is designed to monitor the amount of cash contained in the cash drawer 62 for purposes of indicating when it is time for cash to be "skimmed" from the drawer and for balancing receipts at the end of the day. By having all of the day's orders accumulated on the system, it is possible for there to be a running total of cash that has entered and exited the cash drawers. This running total makes it possible for the system to identify when cash should be skimmed from the drawer during the day, and makes balancing the drawer at the end of a shift or day an easier task.

It is also possible for the cashier to place an order for a customer when a customer is reluctant or unable to utilize the customer self-ordering aspects of the system. The casher station 12 also has the ability to change an order that has been entered into the system by a customer. Any changes made by the cashier can be displayed on the customer terminal 11.

As an order is being placed at a customer station 10, the operating microprocessor 13 transmits the order instantaneously to the cashier station 12, the optional consolidation station 18, the manager station 16 and the food preparation station 20. Generally, the specific order is displayed only on the runner terminal 44 and the food preparation terminal 26. In the preferred embodiment of the invention, the runner terminal 44 and the food preparation terminal 26 are equipped with bump bar mechanisms 48, 58. These mechanisms enable employees to remove an order from their terminals when the order has been filled. Although each individual order could be displayed on the cashier terminal 42 and the manager terminal 22, such information is generally not required at these locations.

The manager station 16 is adapted to provide information to the restaurant manager and to allow the restaurant manager to make alterations to the system. Some information available to the manager is based on orders received throughout a day—e.g., number of customers, when the cash drawers should be skimmed, etc. Other information available to the manager is based on summaries of data that are generated at the cashier station 12.

The consolidation station 18 acts as a data backup for the entire system. In the preferred embodiment, the system utilizes several independent microprocessors. All data and information stored in the individual microprocessors is separately stored at the consolidation station 18.

To help illustrate more fully the operation of the system, a day in the life of the system at a fast food restaurant will be described. The day begins when the manager turns on the system and initiates interaction with the system from the manager station 16. Cashiers are then assigned or logged-on to a specific cashier station 12. This can be done either from the manager station 16 or at individual casher stations 12, and is generally accomplished by the use of secret codes assigned to individual employees.

The cashier, responding to prompts displayed on cashier terminal 42, will activate the desired number of customer stations 10 associated with the cashier station 12. Once activated, the associated customer terminal(s) 11 will display a request for initiation of an order, as illustrated in FIG. 2. The customer entering the restaurant will approach a customer terminal 11 located at the order counter. Normally, the restaurant's menu and prices will be located on a wall behind the counter. All prices may optionally be displayed on the customer terminal 11 along with the individual product listings.

The customer will initiate the ordering process by responding to the terminal's display (see FIG. 2) by touching the appropriate section 60 of the touch screen overlay 40. After the order has been completed, it will be transferred from the associated microprocessor's short term memory to its hard disk memory. After completion of the ordering process, the customer will be presented with a visual receipt of the items ordered and the total cost for the order.

Simultaneously, the order will be transmitted to other stations in the system. In the case of the food preparation station 20 and the runner station 14, the specific order will be displayed on the respective terminals 26, 44. Generally, the cashier must recall the order from the hard disk memory of its associated microprocessor in order to display any particular order. Such a display may include only the total cost of the order, or it may include the full listing of the items in the order.

Once the cash arrangements have been completed, the transaction data is sent to the hard disk of the associated microprocessor for storage. If the cashier station 12 and the customer station 10 are associated with separate microprocessors, the transaction data can be stored in either one or both of the hard disks of the respective microprocessors. The transaction data will also be stored in the hard disk of the microprocessor 56 of the consolidation station 18, if the consolidation station 18 is included in the system.

At the end of each day, the customer stations 10 are deactivated and cash in each cash drawer 62 is reconciled with receipts for the day. Because the vast majority of transactions that occur throughout the day are placed on the system by the customer, there is very little opportunity for the employees of the restaurant to misappropriate any cash from the cash drawers 62. After the settling up of a given cashier station 12 has been completed, the integrated program of the system analyzes the day's data stored in the hard disk storage associated with the cashier and customer stations. The information is broken down into several categories, e.g., total sales; product mix; cashier hourly sales totals. A report is generated supplying a large number of system summaries that are broken down as to cashier station and overall system performance. When a consolidation station 18 is utilized in the system, all of the information for the summaries can be obtained from the consolidation station 18. Absent a consolidation station, the integrated system will allow the user to accumulate the data at any of the cashier stations 12 or at the manager station 16 in order to accomplish the data summarizations.

The summaries are useful to the manager in almost all aspects of the management of the restaurant. Product orders can be reviewed to aid in the purchasing of raw food stuffs. The productivity of employees can be compared. Decisions to offer certain items on a seasonal basis or at particular times of day can also be affected by the various summaries provided by the system.

After the summaries have been completed, the daily information is purged from the hard disk memory of the microprocessor associated with the customer and cashier stations. The daily summaries are held in long term storage at the manager station 16. This information is used to make additional summaries for longer time periods to help the manager identify trends and maintain long-term management perspective.

One additional function of the system is the ability to include training functions. One of the serious problems associated with high employee turnover is the time lost in training employees. The system is designed to provide restaurant managers with an automated training program. The training can be directed specifically to use of the self-ordering system, or can be designed to cover all areas of restaurant employment requirements. By appropriate programming, the system can train an employee for a specific task. For example, if an employee is going to work as a runner, the system can be programmed to go through an instructional mode that will be directed exclusively at the functions of the runner in the system.

An additional capacity of the system that may be valuable for use in the training mode is the ability to display video sequences on any of the terminals of the system. The system may be equipped with a conventional laser disk reader. Video sequences stored on laser disks could be displayed on any terminal. The video capability can have additional benefits beyond the training of employees. For example, the customer ordering sequence could include short video displays, or non-activated customer terminals 11 could display advertisements.

The software required to implement the invention described herein can be developed by one skilled in the art who has the various objectives of this system before him. In order to program in the flexibility that is a hallmark of the system, in the preferred embodiment the software is designed via the use of "box types". According to this mode of programming, each function within the system is defined as a single "box type". Each box has its own separate module within the software. This design permits the changing of existing boxes and addition of new boxes without disrupting the other functions of the system. Moreover, this design permits a main processing module to call one or more functions from either within the main set of box types or from another set of modules produced independently from this system.

The preferred embodiment of the present invention utilizes commercially available components. Preferably, the microprocessor units 13, 24, 28, 56 associated with the customer station 10, the cashier station 12, the manager station 16, the food preparation station 20 and the consolidation station 18 are PS/2 Model 30/286 microprocessor units, which are available from International Business Machines, Inc. ("IBM"). The microprocessor units are equipped with a 20 megabyte hard disk unit, 640K of random access memory (RAM) and 720K of memory on floppy disk. The customer terminals 11 are IBM Model No. 8512 monitors and the cashier terminal 42, runner terminal 44, manager terminal 22 and food preparation terminal 26 are all IBM Model No. 8503 monitors. Several other manufacturers sell equivalent equipment that could be used to perform the functions required by the present invention.

The customer terminals 11 and the cashier terminal are both equipped with touch screen overlays and controllers manufactured by Microtouch. Again, other manufactures sell touch screen overlays that would be suitable for use with this invention. Internal wiring from the touch screen overlays to the touch screen controllers and from the touch controllers to the microprocessors are also included. Null modem cable interconnects each of the microprocessors in the system.

The cashier station 12 also includes a standard cash drawer 62 and a printer 64 for printing customer receipts. The bump bars 48, 58 associated with the runner terminal 44 and the food preparation terminal 26 used in the preferred embodiment are also sold by IBM.

Figure 3:
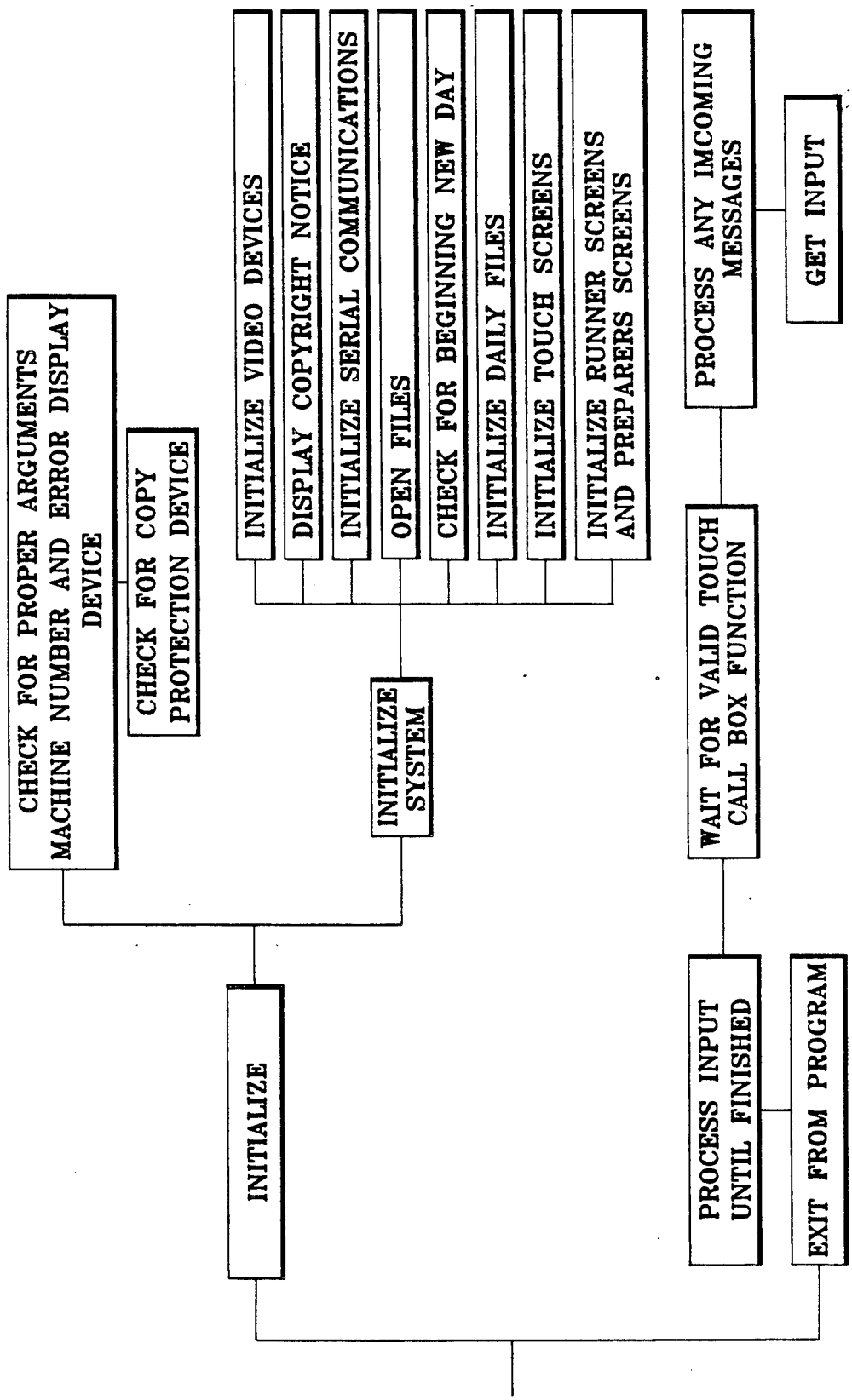
FIG. 3 is a flowchart describing steps performed in a preferred embodiment of the present invention.

An outline of the operation logic of the system is set forth below:

I. Customer Operation
   A. Screen containing system name and START box is displayed (alternatively, the screen may contain several START boxes, each in a different language)
   B. Customer touches START box
   C. Screen containing TAKE OUT box and DINE HERE box is displayed
   D. Customer touches either the TAKE OUT box or the DINE HERE box
   E. Screen containing menu item boxes is displayed
   F. Customer touches one or more of the menu item boxes to order the item(s)
   G. Customer touches FINISHED box
   H. Screen containing suggested item is displayed with a YES box and a NO box
   I. Customer touches either the YES box or the NO box
   J. Screen displaying the total cost of the order is displayed
   K. Customer gives cash and coupons to employee
   L. Employee delivers food to customer (usually while customer is still in the ordering process)
   M. Customer receives food from an employee and change from an employee II. Cashier Operation
   A. Start of Shift
      1. Screen containing main cashier options is displayed
      2. Cashier touches CLOCK IN box to clock in
      3. Cashier touches ASSIGN CASHIER box to begin using station
   B. Processing Orders
      1. Cashier touches NEXT ORDER box to display order to be paid
      2. Cashier may touch CANCEL ITEM box to delete an item(s) from the order
      3. Cashier may touch CHANGE ORDER box to add an item(s) to the order
      4. Cashier may touch PERCENT DISCOUNT box to apply a percentage discount to the order
      5. Cashier may touch DOLLAR DISCOUNT box to apply a dollar discount to the order
      6. Cashier may touch COUPON NUMBER box to apply a coupon discount to the order
      7. Cashier touches AMOUNT TENDERED box to enter cash tendered
      8. Cashier delivers change to customer
   C. End of Shift 1. Cashier touches COUNT DRAWER box to count the drawer
2. Cashier touches CLOCK OUT box to clock out D. End of Day
  1. Manager touches END OF DAY box to print daily reports III. Runner Station Operation
  A. Ordered items appear on the screen as a customer orders the items
  B. The order being assembled is highlighted
  C. Employee touches DONE button to clear the highlighted order from the screen
  D. Employee touches NEXT button to highlight the next order on the screen
  E. Employee touches PREV button to highlight the previous order on the screen
  F. Employee touches FIRST button to highlight the first order on the screen IV. Preparation Terminal Operation
  A. Ordered items appear on the screen as a customer orders
  B. The item being prepared is highlighted
  C. Employee touches the DONE button to clear the highlighted order from the screen
  D. Employee touches NEXT button to highlight the next order on the screen
  E. Employee touches PREV button to highlight the previous order on the screen
  F. Employee touches FIRST button to highlight the first order on the screen A flow diagram of the operation of the system in a preferred embodiment is seen in FIG. 3. The invention claimed below has a variety of applications and is in many ways characterized by its flexibility to individual users. The descriptions given above describe embodiments of the invention for the purposes of example and are in no way intended to limit the claims set forth below.

I claim:

1. A customer operable retail ordering system for reducing employee labor costs, comprising:
  a plurality of customer stations including a first set of customer stations and a second set of customer stations, said first set of customer stations including a first customer station and a second customer station, said second set of customer stations including a third customer station and a fourth customer station;
  each of said first, second, third and fourth customer stations including a terminal and input means for receiving customer-input orders, said terminal including means for displaying a list of ordered items and a running total relating to the ordered items;
  an interactive first cashier station including a terminal for displaying customer-input orders and accepting control commands from a cashier, said first cashier station receiving customer-input orders only from one or more of said first set of customer stations including said first customer station;
  an interactive second cashier station including a terminal for displaying customer-input orders and accepting control commands from a cashier, said second cashier station receiving customer-input orders only from one or more of said second set of customer stations including said third customer station and not from said first and second customer stations;
  first processing means operatively connected to each of said first cashier station, said first customer station and said second customer station, said first processing means including a single first processor and said single first processor being the only processor for substantially controlling all of said receiving, displaying and providing said running total at each of said first and second customer stations and wherein only said single first processor substantially controls all of said displaying and said accepting of said control commands at said first cashier station, said first processing means for controlling the sending of inputs to said first cashier station using information received from at least one of said first and second customer stations; and
  second processing means operatively connected to each of said second cashier station, said third customer station and said fourth customer station, said second processing means including a single second processor and said single second processor being the only processor for substantially controlling all of said receiving, displaying and providing said running total at each of said third and fourth customer stations and wherein only said second single processor substantially controls all of said displaying and said accepting of said control commands at said second cashier station, said second processing means for controlling the sending of inputs to said second cashier station using information received from at least one of said third and fourth customer stations;
  wherein said single first processor does not control said accepting of said control commands at said second cashier station and said single second processor does not control said accepting of said control commands at said first cashier station;
  said first set of customer stations, said first processing means and said first cashier station forming a first cluster means and said second set of customer stations, said second processing means and said second cashier station forming a second cluster means, wherein said first cluster means is separate from and operates independently of said second cluster means whereby the occurrence of a fault associated with the operation between one or more of said customer stations of said first set of customer stations and said first cashier station does not substantially affect the operation between said customer stations of said second set of customer stations and said second cashier station.

2. A system according to claim 1, further comprising:
  an interactive runner station, communicating with said interactive first cashier station and operatively connected to said first processing means, including a runner terminal for selectively displaying the customer-input orders.

3. A system according to claim 2, wherein each of the terminals of said first cashier station, said first and second customer stations and said runner station includes a video monitor.

4. A system according to claim 1, further comprising central processing means, operatively connected to said first cashier station and said first and second customer stations, for collecting and consolidating order data from each of said first and second customer stations and said first cashier station.

5. A system according to claim 1, further comprising at least one interactive preparation station, operatively connected to said first processing means, including a video monitor for selectively displaying the customer-input orders at said preparation station.

6. A system according to claim 4, further comprising an interactive manager station, operatively connected to said central processing means and said first processing means, said interactive manager station monitoring the collected and consolidated data and monitoring data from said first and second customer stations and said first cashier station, said interactive manager station for inputting changes to the system.

7. A system according to claim 1, wherein each of said first and second customer stations is located substantially adjacent to said first cashier station.

8. A system according to claim 1, wherein the control commands inputted to said first cashier station include changes to the customer-input orders and new customer orders and in which said changes are displayed on said terminal of one of said first and second customer stations of said first set of customer stations.

9. A system according to claim 1, wherein said first cashier station also includes a cash drawer and a printer.

10. A system according to claim 1, wherein said terminal of said first cashier station includes a video monitor and a touch-sensitive screen mounted on the monitor for receiving the control commands from the cashier, and each of said terminals of said first and second customer stations includes a video monitor and said input means comprises a touch-sensitive screen mounted on the video monitor.

11. A system according to claim 1, wherein the customer-input orders from said first customer station are automatically inputted to said first cashier station.

12. A customer operable retail ordering system in which a cluster of computer hardware parts is utilized and where each cluster is adapted to operate independently of any other cluster that is available, comprising:
a plurality of customer stations including a first set of customer stations, said first set of customer stations including a first customer station and a second customer station;
said first customer station including a terminal and input means for receiving customer-input orders, said terminal including means for displaying a list of ordered items and a running total relating to the ordered items;
said second customer station including a terminal and input means for receiving customer-input orders, said terminal including means for displaying a list of ordered items and a running total relating to the ordered items;
an interactive first cashier station including a terminal for displaying customer-input orders and accepting control commands from a cashier, said first cashier station receiving customer-input orders only from one or more of said first set of customer stations including said first customer station and not receiving customer-input orders from any customer station that is not part of said first set of customer stations;
first processing means operably connected to each of said cashier station, said first customer station and said second customer station, said first processing means including a single processor and said single processor being the only processor for substantially controlling all of said receiving, displaying and providing said running total at each of said first and second customer stations and wherein only said single processor substantially controls all of said displaying and said accepting of said control commands at said first cashier station, said first processing means for controlling the sending of inputs to said first cashier station using information received from at least one of said first and second customer stations;
wherein said single processor does not control accepting of said control commands at any cashier station other than said first cashier station;
said first set of customer stations, said first processing means and said first cashier station forming a first cluster means wherein said first cluster means is separate from and operates independently of any cluster means different from said first cluster means whereby an occurrence of a fault associated with the operation between a customer station not part of said first set of customer stations and a cashier station other than said first cashier station does not substantially affect the operation between said customer stations of said first set of customer stations and said first cashier station.

13. A customer operable retail ordering system in which a cluster of computer hardware parts is utilized and where each cluster is adapted to operate independently of any other cluster that is available, comprising:
a plurality of customer stations including a first set of customer stations, said first set of customer stations including a first customer station and a second customer station;
said first customer station including a terminal and input means for receiving customer-input orders, said terminal including means for displaying a list of ordered items and a running total relating to the ordered items;
an interactive first cashier station including a terminal for displaying customer-input orders and accepting control commands from a cashier, said first cashier station receiving customer-input orders only from one or more of said first set of customer stations including said first customer station and not receiving customer-input orders from any customer station that is not part of said first set of customer stations;
wherein said control commands inputted to said first cashier station include information provided by a cashier of said first cashier station and said information includes changes to an order that has been entered by a customer and in which said changes made by the cashier are displayed on said terminal of one of said first and second customer stations;
processing means operatively connected to said first cashier station, said first customer station and said second customer station, said processing means for substantially controlling all of said receiving, displaying and providing said running total at each of said first and second customer stations, said processing means for controlling the sending of inputs to said first cashier station using information received from at least one of said first and second customer stations; and
said first set of customer stations, said processing means and said first cashier station forming a first cluster means, wherein said first cluster means is separate from and operates independently of any other available cluster means whereby an occurrence of a fault associated with the operation between a customer station different from a customer station of said first set of customer stations and a cashier station different from said first cashier station does not substantially affect operation between said customer stations of said first set of customer stations and said first cashier station.

* * * * *